(12) United States Patent
Gourlay et al.

(10) Patent No.: US 11,947,151 B2
(45) Date of Patent: Apr. 2, 2024

(54) HOMOGENEOUS COLOR LED LIGHTING DEVICE WITH WAVELENGTH DEPENDENT MODIFIER ON OUTPUT SURFACE OF LIGHTGUIDE

(71) Applicant: DESIGN LED PRODUCTS LIMITED, Livingston (GB)

(72) Inventors: James Gourlay, Livingston (GB); Marius Jankauskas, Livingston (GB)

(73) Assignee: Design LED Products Limited, Livingston (GB)

( * ) Notice: Subject to any disclaimer, the term of this patent is extended or adjusted under 35 U.S.C. 154(b) by 0 days.

(21) Appl. No.: 17/917,635

(22) PCT Filed: Apr. 8, 2021

(86) PCT No.: PCT/GB2021/050858
§ 371 (c)(1),
(2) Date: Oct. 7, 2022

(87) PCT Pub. No.: WO2021/205168
PCT Pub. Date: Oct. 14, 2021

(65) Prior Publication Data
US 2023/0185012 A1 Jun. 15, 2023

(30) Foreign Application Priority Data
Apr. 9, 2020 (GB) ...................................... 2005328

(51) Int. Cl.
*F21V 8/00* (2006.01)
*B60G 3/00* (2006.01)

(52) U.S. Cl.
CPC ......... *G02B 6/0036* (2013.01); *G02B 6/0025* (2013.01); *G02B 6/0068* (2013.01); *G02B 6/0073* (2013.01); *B60G 3/00* (2013.01)

(58) Field of Classification Search
CPC .. G02B 6/0036; G02B 6/0068; G02B 6/0073; G02B 6/0033; G02B 6/0035;
(Continued)

(56) References Cited

U.S. PATENT DOCUMENTS 8,089,583 B2 * 1/2012 Li ..................... G02B 6/0076
362/330
8,439,547 B2 * 5/2013 Chiu .................. G02B 6/0026
349/62
(Continued)

FOREIGN PATENT DOCUMENTS

CN 107505774 A 12/2017
EP 3279548 A1 2/2018
(Continued)

OTHER PUBLICATIONS

International Search Report and Written Opinion dated Jul. 9, 2021 for PCT/GB2021/050858.

*Primary Examiner* — Ismael Negron
(74) *Attorney, Agent, or Firm* — FisherBroyles, LLP

(57) ABSTRACT

A lighting device includes a light guide having a light output surface, one or more LED packages having two or more spatially separated LED chips, and two or more wavelength dependent modification features located on the output surface of the light guide. Each wavelength dependent modification features is configured to modify the intensity of light from one or more of the LED chips to provide homogeneous colored light.

20 Claims, 5 Drawing Sheets

(58) Field of Classification Search
CPC ..... G02B 6/0061; H01L 33/50; H01L 33/502;
H01L 33/504
See application file for complete search history.

(56) References Cited

U.S. PATENT DOCUMENTS

| | | | |
|---|---|---|---|
| 9,575,362 B2* | 2/2017 | Lee | G02F 1/133603 |
| 10,359,558 B2* | 7/2019 | Tai | G02B 6/0061 |
| 2004/0135273 A1* | 7/2004 | Parker | G02B 6/0036 |
| | | | 264/1.6 |
| 2007/0158666 A1* | 7/2007 | Yu | G02B 6/0026 |
| | | | 257/98 |
| 2009/0316077 A1 | 12/2009 | Li et al. | |
| 2010/0271807 A1 | 10/2010 | Chiu et al. | |
| 2015/0160513 A1 | 6/2015 | Lee et al. | |
| 2017/0261677 A1 | 9/2017 | Tai et al. | |

FOREIGN PATENT DOCUMENTS

| | | |
|---|---|---|
| JP | H09167860 A1 | 6/2009 |
| KR | 20130068239 A | 6/2013 |

* cited by examiner

HOMOGENEOUS COLOR LED LIGHTING DEVICE WITH WAVELENGTH DEPENDENT MODIFIER ON OUTPUT SURFACE OF LIGHTGUIDE

This application is the U.S. National Stage of International Application No. PCT/GB2021/050858, which was filed on Apr. 8, 2021. This application also claims the benefit of the filing date of GB patent application No. 2005328.6, which was filed on Apr. 9, 2020. The contents of both of those applications are hereby incorporated by reference.

The present invention relates to the field of lighting, and in particular, to a homogeneous colour lighting device that can be used for illumination, backlighting, signage or display purpose. The described homogeneous colour lighting device finds particular application within the field of transportation e.g. the automotive, train and aerospace industries.

BACKGROUND TO THE INVENTION

Lighting is a key means of making interior vehicle spaces, where passengers stand or sit during transportation, more attractive and pleasant environments. One of the most effective ways to deliver light into these environments, while saving space, is to backlight the interior surfaces of the vehicles. As a result, there is a requirement for a uniform, low intensity light level to be provided over a large surface area. This uniform, low intensity light level is required in order to keep the glare experienced by passengers being transported within the vehicles to a minimum, whilst also providing a means to attractively decorate and illuminate the interior surfaces.

Due to space and weight constraints within vehicles, any light source solution must be very thin, of the order of ~1 mm. In addition, due to vibration and integration constraints, the lighting device must also be capable of being mechanically attached, bonded, joined or moulded onto the internal surface of the vehicle.

A number of light source technologies exist which can be employed within the field of transportation. Two such examples are electroluminescent film and organic light emitting diodes (OLED). Both solutions involve an active light emitting material that covers the entire surface to be backlit. However, both technologies are expensive, have a low reliability and lifetime and so neither are ideally suited as an integrated solution for transportation interiors.

Inorganic light emitting diodes (LEDs) are the most common lighting technology employed for transportation lighting. LEDs are small solid state, semiconductor chip-based devices, that can be designed to emit different colours of light, or when used in combination with colour converting materials, to provide white light. However, LEDs are small points of light, and therefore require an external optical system to turn them into large area, homogeneous coloured, uniform intensity lighting surfaces.

Typically, multicolour or colour changeable LEDs consist of two or more LED inorganic chips, integrated inside a single electronic package. The most common multi-chip LED package however is the so called RGB LED package, a schematic representation of one type of which is provided in FIG. 1(a) and depicted generally by reference numeral 1. The RGB LED package 1 can be seen to comprise a red LED chip 2, a green LED chip 3 and a blue LED chip 4 all mounted on a common surface 5 of a surface mount, package lead-frame 6. A transparent casing 7 covers the three separate chips 2, 3 and 4 to provide them with a physical protective barrier. The RGB LED package 1 is therefore designed to emit light generated by the three separate chips 2, 3 and 4 from all five surfaces that are not in contact with the PCB 6.

A schematic representation of second type of RGB LED package known in the art is provided in FIG. 1(b) and depicted generally by reference numerals 8. The RGB LED package 8 can be seen to comprise a red LED chip 2, a green LED chip 3 and a blue LED chip 4 all again mounted on a common surface 5 of a surface mount package lead-frame 6. A transparent casing 9 again covers the three separate chips 2, 3 and 4 to provide them with a physical protective barrier. However, in this embodiment the transparent casing 9 is only transparent on one surface 10, that is the side opposite to the common surface 5 of the lead-frame 6. The RGB LED package 8 is therefore designed to emit light generated by the three separate chips 2, 3 and 4 from only the one surface 10.

A known configuration of optical system employed to achieve a large area, homogeneous coloured, uniform intensity lighting surface is to deploy RGB LED packages 1 and 8 in a 2 D matrix across a printed circuit board (PCB) and then place a diffuser layer on top of the 2 D matrix. This is conventionally known as a direct-lit LED backlight. An advantage of the direct-lit LED backlight approach is that each RGB LED package 1 and 8 is independently addressable, and so a pixelated area light source can be produced. However, such systems require either the RGB LED packages 1 and 8 to be very closely packed, which results in high power density and cost per area, or the employment of a very thick optical system (e.g. an air gap and/or diffuser thickness), which then makes them unsuitable for deployment within the limited interior transport spaces. For example, if the RGB LED packages 1 and 8 are spaced 20 mm apart, the optical system depth is required to be >20 mm.

It is also known in the art to employ light guides to distribute light from a light source e.g. a RGB LED package 1 and 8 to an area that requires illumination. One known type of light-guide is an optical fibre, which is typically made up of a transparent material (glass or plastic) with thin filaments that are capable of transmitting light. An alternative known type of light-guide is a planar light-guide. These are plates or panel light-guides, which are typically formed as thin cuboids.

Both light-guide designs exploit the effects of refraction caused by two materials having different refractive index. In particular, a light-guide transports light from one location to another, by exploiting the effects of total internal reflection experienced by the light propagating within the material when it encounters a boundary surrounding the material. A further useful property of the aforementioned light-guides is their ability to take the intensity of the light output from a RGB LED package 1 and 8 and spread it evenly and or change its shape or distribution to achieve a desired result.

The above described, light-guiding approaches have been further developed to try and meet the space limitations of backlighting within the field of transportation. One approach is to distribute the RGB LED packages 1 and 8 in a 2 D matrix across a planar light-guide, and then optically couple the light emitted from the RGB LED packages 1 and 8 into the planar light guide. An example of such a system is presented in FIGS. 2 and 3. In particular, FIG. 2 presents a two-dimensional, cross sectional side view of a lighting device 11 that comprise a planar light-guide 12 having cavities 13 (only one being shown in FIG. 2 for simplicity) within which an RGB LED package 1 is located. FIG. 3 presents a plan view of the lighting device 11 shown in FIG. 2. Light extraction features (not shown) inside, or on surface of the planar light-guide 12, are then employed to provide a means for the light to exit the light-guide structure via a light output surface 14. The design of the light extraction features (variation in size, density etc.) again provides a means for increasing the intensity uniformity of the backlighting of a surface material across the light output surface 14.

However, it is known in the art that the spatially separation of the chips 2, 3 and 4 in the RGB LED packages 1 and 8 result in optical systems designed around such RGB LED packages 1 and 8 having effectively three separate colour light sources, located at different positions, typically on the scale of 100 s of microns apart. Such an arrangement can results in a non-homogeneous colouring effect within the optical system particularly when viewed close to the location of a RGB LED package 1 and 8.

This problematic feature will be described in further detail with reference to the lighting device 11 presented in FIGS. 2 and 3. As can be seen from FIG. 2 a ray of red light 15 emitted from the red LED chip 2 and a ray of blue light 16 emitted from the blue LED chip 4 can be seen to converge at a common point 17 on the light output surface 14. The path length of the ray of blue light 16 is greater than that of the ray of red light 15. Due to the inverse square law of the irradiance of light, the amount of light from the blue LED chip 4 will therefore be less that the amount of light from the red LED chip 2 at point 6.

The overall result is that three separate regions are formed on the light output surface 14, as presented in FIG. 3, namely: a red region 18 where irradiance generated by the red LED chip 2 will be higher than that generated by either the green LED chip 3 or the blue LED chip 4; a green region 19 where irradiance generated by the green LED chip 3 will be higher than that generated by either the red LED chip 2 or the blue LED chip 4; and a blue region 20 where irradiance generated by the blue LED chip 4 will be higher than that generated by either the red LED chip 2 or the green LED chip 3.

As a result of the spatial separation of the chips 2, 3 and 4 in the RGB LED packages 1 and 8 a colour variation is present across the light output surface 14 i.e. the separate sources of red, green and blue light cause regions of slightly different white colour, when all of the different coloured chips 2, 3 and 4 are powered. Therefore, when observed close to the location of a RGB LED package 1 and 8, the emitted light of the light-guide device 11 results in a non-homogeneous colouring effect being visible to the human eye.

Refractive optical systems with a long path length, such a light pipes and fibre optic mats can remove this issue of non-homogeneous colouring. For lamps based on these type of RGB LED packages 1 and 8, a known solution to this problematic effect is to incorporate projecting optics that have to be carefully designed to avoid the separation of the red, green and blue light being apparent on the surface from where the output light is projected. Typically, this requires the employment of a very complex refractive colour mixing optical system. The use of a diffuser layer is also known to mitigate the problematic non-homogeneous colouring effect. However, if the depth of the thickness of the diffuser layer is reduced to a levels required for use within the field of transportation then each of the RGB LED packages 1 and 8 again begin to exhibit the above described non-homogeneous colouring effect within its emitted light.

Therefore, in regions around a RGB LED package 1 and 8, and in particular, within 2 D LED matrix arrays coupled to a light-guide plate, this non-homogeneous colouring effect remains a significant problem.

A further issue with multi-chip LED packages, is achieving colour homogeneity directly above the LED package. In the past filters or absorbing materials have been employed to reduce the intensity of the light in these areas. However, such solutions result in the spatial position of the multi-chip light sources in the LED package, and any colour compensation features, to be visible as inhomogeneity.

SUMMARY OF THE INVENTION

It is therefore an object of an embodiment of the present invention to provide an alternative lighting device that provides a homogeneous colour light output.

It is a further object of an embodiment of the present invention to provide a lighting device that provides a homogeneous colour light output that is thinner than those lighting devices known in the art.

According to a first aspect of the present invention there is provided a lighting device comprising a light guide and one or more LED packages, the one or more LED packages having two or more spatially separated LED chips that generate two or more light outputs at two or more separate wavelengths, wherein the two or more light outputs are optically coupled into the light guide and a portion of the two or more light outputs exit the light guide via a light output surface wherein the light guide further comprises one or more wavelength dependent modification features arranged to modify the intensity of at least one of the two or more light outputs to provide the lighting device with a homogeneous colour light output.

Optionally, the one or more wavelength dependent modification features are located on the light output surface. Alternatively, the one or more wavelength dependent modification features are located within the light guide.

Optionally the light guide comprises a planar light guide having one or more cavities for housing the one or more LED packages.

Alternatively, the LED packages are optically coupled to the planar light guide without cavities, by other methods known to the art, such as being embedded directly inside the light guide material or with an additional coupling optical feature on the surface.

Optionally, the lighting device further comprise a diffuser and an opaque mask located between one of the one or more LED packages and the diffuser, wherein the opaque mask comprises one or more apertures. The one or more apertures effectively form a mixed light source, but at a very much lower intensity level than generated by the LED package itself. The diffuser then acts to break the angular dependence of the different colours from the separate LED chips, resulting in output light from the lighting device that comprises a homogenous, equally mixed, light.

Optionally the one or more LED packages comprise an RGB LED package having a red LED chip, a green LED chip and a blue LED chip which emit light from five surfaces of the package.

In this embodiment, one of the wavelength dependent modification features may be cyan coloured and arranged to be closer to the red LED chip than either of the green LED chip or the blue LED chip. It is preferable for the cyan coloured wavelength dependent modification feature to be equidistant from the green LED chip and the blue LED chip. As a result of this arrangement, a homogeneous colour light output is provided from the light output surface in the vicinity of the red LED chip 14.

In this embodiment, one of the wavelength dependent modification features may be magenta coloured and arranged to be closer to the green LED chip than either of the red LED chip or the blue LED chip. It is preferable for the magenta coloured wavelength dependent modification feature to be equidistant from the red LED chip and the blue LED chip. As a result of this arrangement, a homogeneous colour light output is provided from the light output surface in the vicinity of the green LED chip.

In this embodiment, one of the wavelength dependent modification features may be yellow coloured and arranged to be closer to the blue LED chip than either of the red LED chip or the green LED chip. It is preferable for the yellow coloured wavelength dependent modification feature to be equidistant from the red LED chip and the green LED chip. As a result of this arrangement, a homogeneous colour light output is provided from the light output surface in the vicinity of the blue LED chip.

Alternatively, the one or more LED packages comprise an RGB LED package having a red LED chip, a green LED chip and a blue LED chip which emit light from a single surface of the package.

In this embodiment, one of the wavelength dependent modification features may be cyan coloured and arranged to be further away from the red LED chip than either of the green LED chip or the blue LED chip. It is preferable for the cyan coloured wavelength dependent modification feature to be equidistant from the green LED chip and the blue LED chip. As a result of this arrangement, a homogeneous colour light output is provided from the light output surface in the vicinity of the red LED chip.

In this embodiment, one of the wavelength dependent modification features may be magenta coloured and arranged to be further away from the green LED chip than either of the red LED chip or the blue LED chip. It is preferable for the magenta coloured wavelength dependent modification feature to be equidistant from the red LED chip and the blue LED chip. As a result of this arrangement, a homogeneous colour light output is provided from the light output surface in the vicinity of the green LED chip.

In this embodiment, one of the wavelength dependent modification features may be yellow coloured and arranged to be further away from the blue LED chip than either of the red LED chip or the green LED chip. It is preferable for the yellow coloured wavelength dependent modification feature to be equidistant from the red LED chip and the green LED chip. As a result of this arrangement, a homogeneous colour light output is provided from the light output surface in the vicinity of the blue LED chip.

Most preferably the one or more wavelength dependent modification features comprises an ink, dye or pigment. The wavelength dependent modification features may be homogenous in nature or formed in a pattern.

According to a second aspect of the present invention there is provided a lighting device comprising one or more LED packages, a diffuser and an opaque mask located between one of the one or more LED packages and the diffuser wherein the opaque mask comprises one or more apertures. The one or more apertures effectively form a mixed light source, but at a very much lower intensity level than generated by the LED package itself. The diffuser then acts to break the angular dependence of the different colours from the separate LED chips, resulting in output light from the lighting device that comprises a homogenous, equally mixed, light.

Embodiments of the second aspect of the invention may include one or more features of the first aspect of the invention or its embodiments, or vice versa.

According to a third aspect of the present invention there is provided method of generating a homogeneous colour light output the method comprising:
  optically coupling two or more spatially separated light outputs, at two or more separate wavelengths, into a light guide;
  arranging for a portion of the two or more light outputs to exit the light guide via a light output surface; and
  providing the light guide with one or more wavelength dependent modification features arranged to modify the intensity of at least one of the two or more light outputs.

Optionally, the one or more wavelength dependent modification features are provided on the light output surface. Alternatively, the one or more wavelength dependent modification features are provided within the light guide.

The method of generating a homogeneous colour light output may further comprise:
  providing a diffuser and an opaque mask wherein the opaque mask is located between the two or more spatially separated light outputs and the diffuser; and
  providing the opaque mask with one or more apertures.

Preferably optically coupling the two or more spatially separated light outputs comprises optically coupling a red, a green and a blue light output into the light guide.

In this embodiment providing the light guide with one or more wavelength dependent modification features may comprise providing a cyan coloured wavelength dependent modification feature closer to the red light output than either of the green light output or the blue light output. It is preferable for the cyan coloured wavelength dependent modification feature to be provided equidistant from the green light output and the blue light output.

In this embodiment providing the light guide with one or more wavelength dependent modification features may comprise providing a magenta coloured wavelength dependent modification feature closer to the green light output than either of the red light output or the blue light output. It is preferable for the magenta coloured wavelength dependent modification feature to be provided equidistant from the red light output and the blue light output.

In this embodiment providing the light guide with one or more wavelength dependent modification features may comprise providing a yellow coloured wavelength dependent modification feature closer to the blue light output than either of the red light output or the green light output. It is preferable for the yellow coloured wavelength dependent modification feature to be provided equidistant from the red light output and the green light output.

In an alternative embodiment providing the light guide with one or more wavelength dependent modification features may comprise providing a cyan coloured wavelength dependent modification feature further away from the red light output than either of the green light output or the blue light output. It is preferable for the cyan coloured wavelength dependent modification feature to be provided equidistant from the green light output and the blue light output.

In this alternative embodiment providing the light guide with one or more wavelength dependent modification features may comprise providing a magenta coloured wavelength dependent modification feature further away from the green light output than either of the red light output or the blue light output. It is preferable for the magenta coloured wavelength dependent modification feature to be provided equidistant from the red light output and the blue light output.

In this alternative embodiment providing the light guide with one or more wavelength dependent modification features may comprise providing a yellow coloured wavelength dependent modification feature further away from the blue light output than either of the red light output or the green light output. It is preferable for the yellow coloured wavelength dependent modification feature to be provided equidistant from the red light output and the green light output.

Embodiments of the third aspect of the invention may include one or more features of the first or second aspects of the invention or its embodiments, or vice versa.

According to a fourth aspect of the present invention there is provided method of generating a homogeneous colour light output the method comprising:
propagating two or more spatially separated light outputs, at two or more separate wavelengths, through a diffuser;
providing an opaque mask between the two or more spatially separated light outputs and the diffuser; and
providing the opaque mask with one or more apertures.

Embodiments of the fourth aspect of the invention may include one or more features of the first to third aspects of the invention or its embodiments, or vice versa.

BRIEF DESCRIPTION OF THE DRAWINGS

There will now be described, by way of example only, various embodiments of the invention with reference to the drawings, of which:

FIG. 1(a) presents a schematic representation of a first type of RGB LED package known in the art while

Figure 1A:
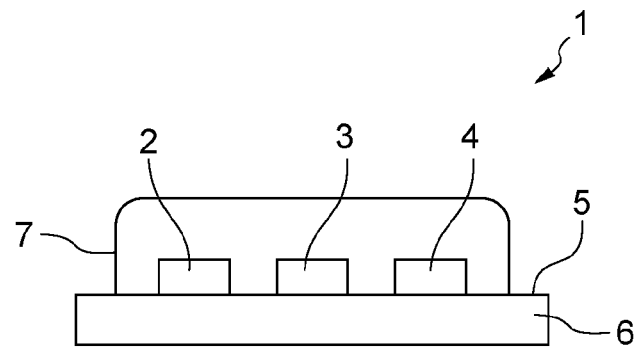
Figure 1B:
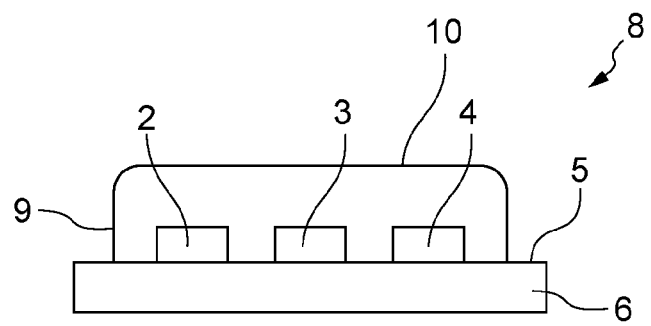
FIG. 1(b) presents a schematic representation of second type of RGB LED package known in the art.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION OF PREFERRED EMBODIMENTS

Figure 4:
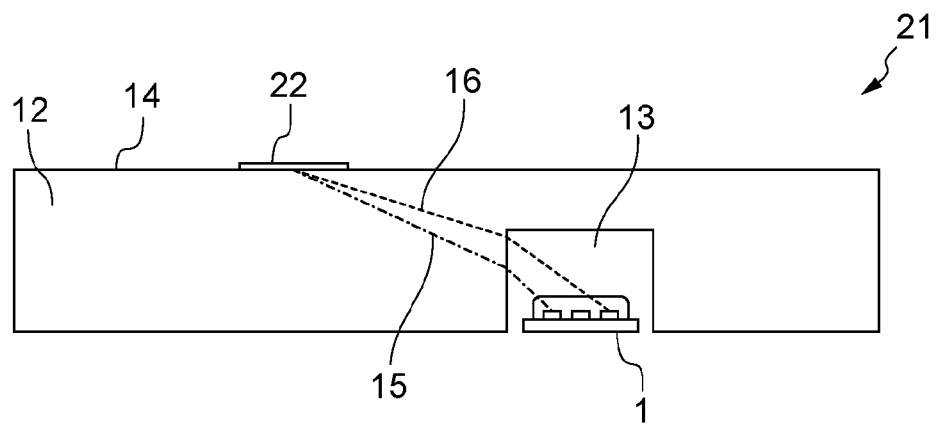
FIG. 4 presents a two-dimensional, cross sectional side view of a lighting device in accordance with an embodiment of the present invention.
Figure 5:
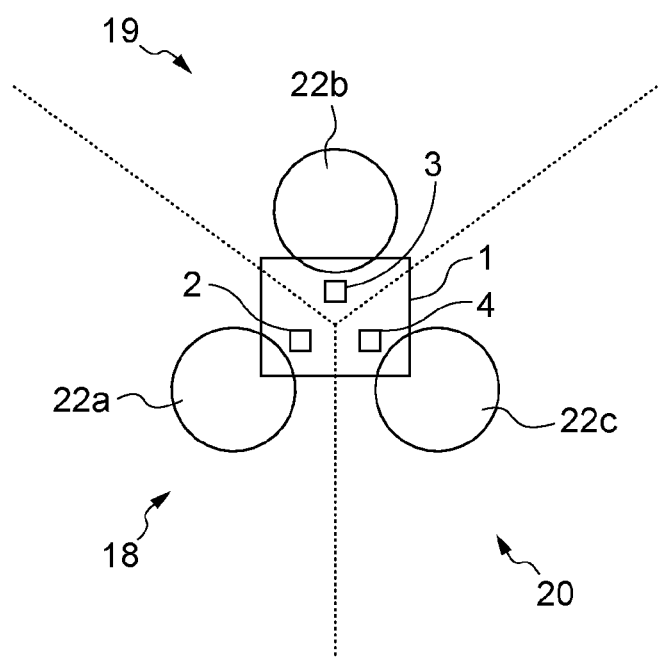
FIG. 5 presents a plan view of the lighting device shown in FIG. 4.

A two-dimensional, cross sectional side view of a lighting device 21 in accordance with an embodiment of the present invention is presented in FIG. 4. The lighting device 21 can be seen to be similar to lighting device 11 described above with reference to FIG. 2 in that it comprise a planar light-guide 12 having cavities 13 (only one being shown in FIG. 4 for simplicity) within which a first type of RGB LED package 1 is located. FIG. 5 presents a plan view of the lighting device 21 shown in FIG. 4. Light extraction features (not shown) inside, or on surface of the planar light-guide 12, may again be employed to provide a means for the light to exit the lighting device 11 via a light output surface 14 The design of the light extraction features (variation in size, density etc.) again provides a means for increasing the intensity uniformity of the output light.

Figure 2:
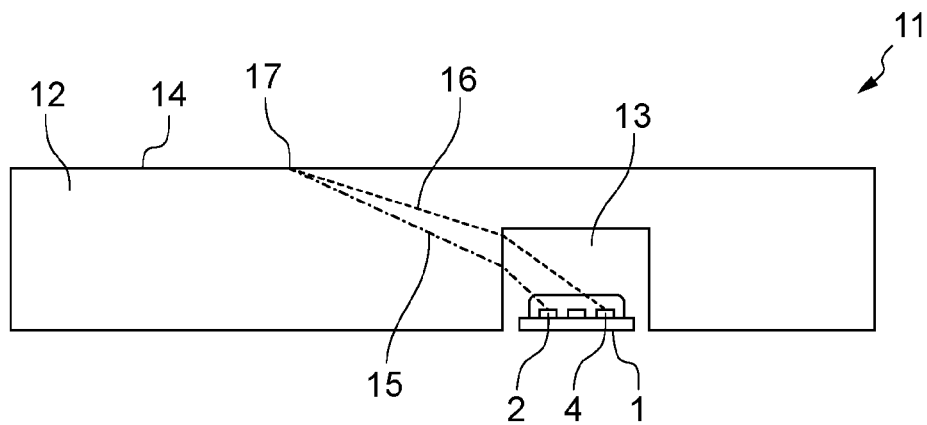
FIG. 2 presents a two-dimensional, cross sectional side view of a lighting device as known in the art.
Figure 3:
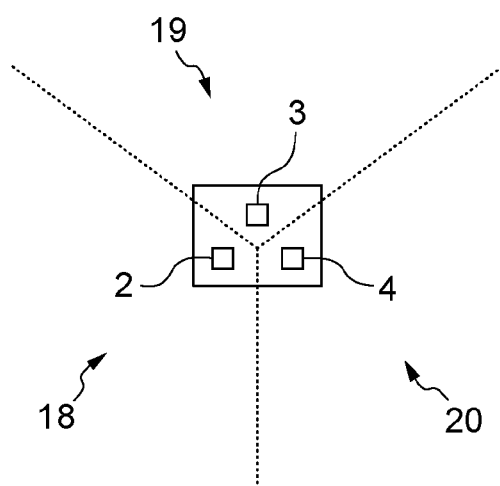
FIG. 3 presents a plan view of the lighting device shown in FIG. 2.

Unlike the lighting device 11 of FIG. 2, the lighting device 21 can be seen to further comprise one (see FIG. 4) or more (see FIG. 5) wavelength dependent modification features 22 located on the light output surface 14.

In FIG. 4, the wavelength dependent modification feature 22 comprises a cyan coloured ink spot 22a printed on the light output surface 14 so that it lies closer to the red LED chip 2 than either of the green LED chip 3 or the blue LED chip 4 i.e. it lies within the red region 18 of the light output surface 14. It is preferable for the cyan coloured ink spot 22a to be equidistant from the green LED chip 3 and the blue LED chip 4. Because of the colour selection of the wavelength dependent modification feature 22a it acts to selectively reduce the red content of the output light from the lighting device 21 but leaves the green and blue content largely unaltered. As a result, a homogeneous colour light output is provided from the RGB LED package 1 within the red region 18 of the light output surface 14.

As can be seen from FIG. 5, the use of wavelength dependent modification features 22 can be extended to ensure that a homogeneous colour light output is provided from the RGB LED package 1 within both the green 19 and blue regions 20 of the light output surface 14. In the green region 19 the wavelength dependent modification feature 22 comprises a magenta coloured ink spot 22b printed on the light output surface 14 so that it lies closer to the green LED chip 3 than either of the red LED chip 2 or the blue LED chip 4. It is preferable for magenta coloured ink spot 22b to be equidistant from the red LED chip 2 and the blue LED chip 4. Because of the colour selection of the wavelength dependent modification feature 22b it acts to selectively reduce the green content of the output light from the lighting device 21 but leaves the red and blue content largely unaltered.

In a similar manner, within the blue region 20 the wavelength dependent modification feature 22 comprises a yellow coloured ink spot 22c printed on the light output surface 14 so that it lies closer to the blue LED chip 4 than either of the red LED chip 2 or the green LED chip 3. It is preferable for yellow coloured ink spot 22c to be equidistant from the red LED chip 2 and the green LED chip 3. Because of the colour selection of the wavelength dependent modification feature 22c it acts to selectively reduce the blue content of the output light from the lighting device 21 but leaves the red and green content largely unaltered.

The presence of the three coloured ink spots 22a, 22b and 22c is found to remove the issue of non-homogeneous colouring within the output light generated by the lighting device 21 since the wavelength dependent modification features 22 act to change the amount of light emitted from the associated LED chip 2, 3 and 4 by selective absorption at the associated wavelength of the output light.

It will be appreciated by the skilled reader that the wavelength dependent modification features 22 can take a variety of forms and spatial locations. They can be located on the light output surface 14 or inside the planar light-guide 12. Furthermore, the wavelength dependent modification features 22 can be homogenous in nature or formed in a pattern. In alternative embodiments the wavelength dependent modification features 22 may comprise a dye or a pigment.

The choice of the composition of the wavelength dependent modification features 22 may also be selected to change the amount of light from the one or more of the multi-light sources 2, 3 and 4 by a process of addition rather than absorption i.e. rather the coloured ink spot 22a acting to selectively reduce the red content of the output light from the lighting device 21 it instead acts to add to the green and blue content of the output light within the red region 18 of the light output surface 14. Similarly, the coloured ink spot 22b can be selected to add to the red and blue content of the output light within the green region 19 of the light output surface 14 while leaving the green content of the output light largely unaltered. In the same way, the coloured ink spot 22c can be selected to add to the red and green content of the output light within the blue region 20 of the light output surface 14 while leaving the blue content of the output light largely unaltered.

In an alternative embodiment, the LED packages may be optically coupled to the planar light guide without the use of cavities. A number of alternative means are known in the art, such as having the LED packages embedded directly inside the light guide material or with an additional coupling optical feature on the surface.

Figure 6:
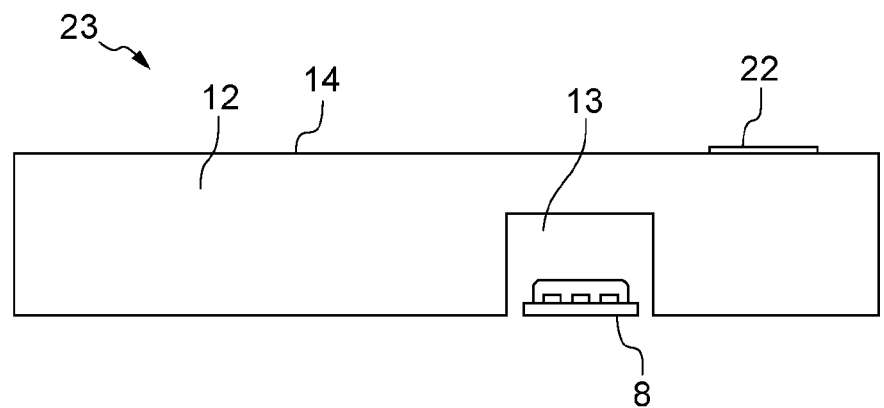
FIG. 6 presents a two-dimensional, cross sectional side view of a lighting device in accordance with an alternative embodiment of the present invention.
Figure 7:
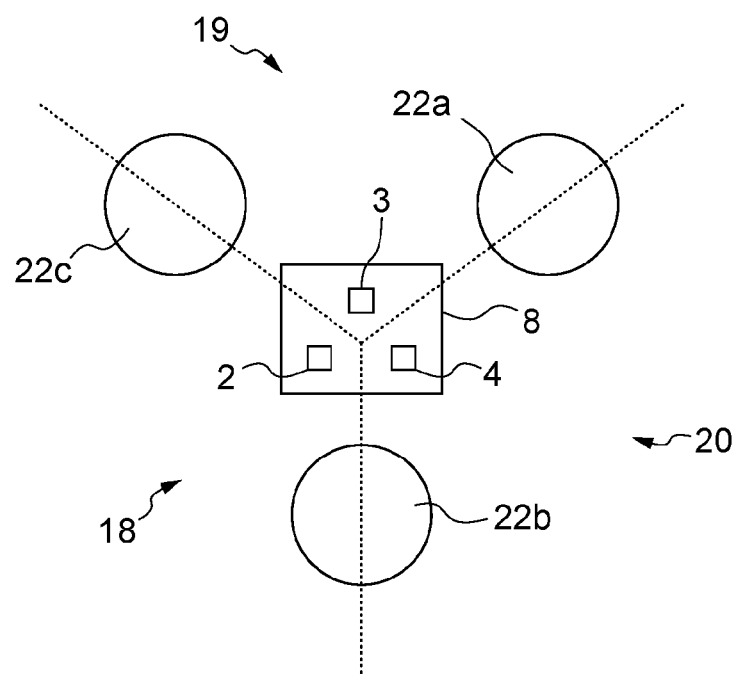
FIG. 7 presents a plan view of the lighting device shown in FIG. 4.

During the development on this invention the applicants have found that the location of the wavelength dependent modification features 22 has to be altered when the lighting device 23 was of the type presented in FIGS. 6 and 7 i.e. it comprises a second type RGB LED package 8. In these embodiments the wavelength dependent modification feature 22 are required to be located so that the LED chip with which it is intended to interact is located further away from the wavelength dependent modification feature 22 than the other two LED chips.

With reference to FIGS. 6 and 7, the wavelength dependent modification feature 22 comprises a cyan coloured ink spot 22a printed on the light output surface 14 so that it lies further away from to the red LED chip 2 than either of the green LED chip 3 or the blue LED chip 4 i.e. it lies outside of the red region 18 of the light output surface 14. It is again preferable for the cyan coloured ink spot 22a to be equidistant from the green LED chip 3 and the blue LED chip 4.

With respect to the green LED chip 3 the wavelength dependent modification feature 22 comprises a magenta coloured ink spot 23b printed on the light output surface 15 so that it lies further away from the green LED chip 3 than either of the red LED chip 2 or the blue LED chip 4. It is preferable for magenta coloured ink spot 23b to again be equidistant from the red LED chip 2 and the blue LED chip 4.

Similarly, with respect to the blue LED chip 4 the wavelength dependent modification feature 22 comprises a yellow coloured ink spot 22c printed on the light output surface 15 so that it further away from the blue LED chip 4 than either of the red LED chip 2 or the green LED chip 3. It is preferable for yellow coloured ink spot 22c to again be equidistant from the red LED chip 2 and the green LED chip 3.

The applicant believe that the reason for this inversion requirement in the spatial location of the wavelength dependent modification feature 22 is a result of reflections of the output light from the LED chips 2, 3 and 4 from the internal side walls of the transparent casing 9.

Figure 8:
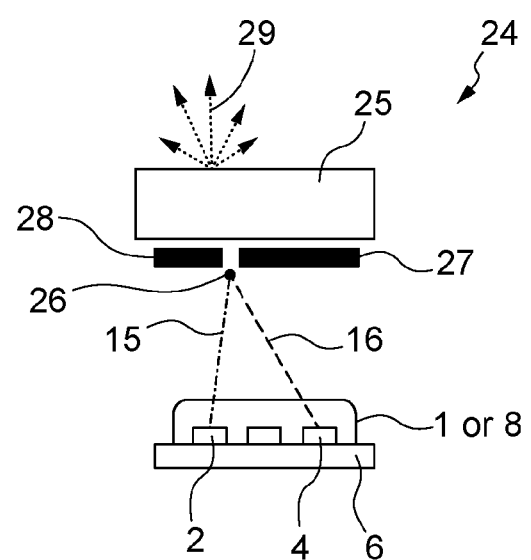
FIG. 8 presents a two-dimensional, cross sectional side view of a lighting device in accordance with a further alternative embodiment of the present invention.

FIG. 8 presents a two-dimensional, cross sectional side view of a lighting device 24 in accordance with a further alternative embodiment of the present invention. As can be seen from FIG. 8, one or more RGB LED packages 1 and 8 are located with a diffuser 25 such that light 26 emitted from the one or more RGB LED packages 1 and 8 propagates through the diffuser 25 before exiting the lighting device via a light output surface 14. An opaque mask 27 is located between a RGB LED packages 1 and 8 the diffuser 25. One or more apertures 28 are formed in the opaque mask 27 to allow the light 26 from of the red, green and blue LED chips 2, 3 and 4 to mix at the location of the one or more apertures 28. The one or more apertures 28 effectively form a mixed light source, but at a very much lower intensity level than generated by the RGB LED packages 1 and 8 itself. The diffuser 25 then acts to break the angular dependence of the different colours from the separate LED chips 2, 3 and 4, resulting in output light 29 from the lighting device 24 that comprises a homogenous, equally mixed, light.

It will be appreciated that the opaque mask 27 may be arranged to interact with two or more of the RGB LED packages 1 and 8 within the lighting device 24 or alternatively there may be a dedicated opaque mask 27 for each of the RGB LED packages 1 and 8.

The lighting device 24 therefore provides a low level of homogenous, equally mixed, colour light (e.g. white) above the RGB LED packages 1 and 8. This addresses the problem of colour homogeneity directly above the LED package and the requirement to balance the light irradiance within this region with the regions located away from the RGB LED packages 1 and 8. This solution is particularly suited for backlighting the interior surfaces of vehicles since only a very small amount of light is needed above the RGB LED packages 1 and 8. The low level of light from the diffuser 25, balances with the light emitting from the regions away from the RGB LED packages 1 and 8, forming an overall homogenous appearance across the entire lighting device 24, with the matrix array of RGB LED packages 1 and 8.

The present invention provides a number of alternative homogeneous colour lighting devices, capable of providing low intensity light level over a larger surface area, compared to those known in the art.

A significant advantage of the present invention is that the homogeneous colour lighting devices can be made much thinner than those devices known in the art without introducing the problematic features colour non-uniformity artefacts i.e. a thin device can be produced that exhibits a highly uniform white light output, from different coloured light sources, over a large surface area.

The disclosed homogeneous colour lighting devices are also cheaper to manufacture, and have a higher reliability and lifetime, than alternative solutions known in the art.

Since the homogeneous colour lighting devices can comprise a plurality of individual light sources, they exhibit the further advantage that each light source can be made independently addressable, and so a pixelated area light source can be produced.

As a result of the above described advantages, the homogeneous colour lighting devices of the present invention find particular application within the field of transportation e.g. the automotive, train and aerospace industries where there is a requirement for a thin, robust device that is capable of being mechanically attached, bonded, joined or moulded onto the internal surface of the vehicle.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers. Furthermore, unless the context demands otherwise, the term "or" will be interpreted as being inclusive not exclusive.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A lighting device comprising:
   one or more LED packages having at least first and second spatially separated LED chips, the first LED chip configured to generate a light output at a first wavelength, the second LED chip configured to generate light at a second wavelength different from the first wavelength;
   a light guide receiving light from the one or more LED packages, and emitting the received light from a light output surface;
   at least one first wavelength dependent modification feature located on a first area of the light output surface and configured to selectively modify an intensity of the light of the first LED chip; and
   at least one second wavelength dependent modification feature located on a second area of the light output surface, and configured to selectively modify an intensity of the light output of the second LED chip,
   wherein at least a portion of the light outputs from the first and second LED chips exit the light guide via the light output surface, such that the lighting device provides a homogeneous color light output.

2. A lighting device as claimed in claim 1, further comprising:
   a diffuser, and
   an opaque mask having at least one aperture, the opaque mask located between at least one of the one or more LED packages and the diffuser.

3. A lighting device as claimed in claim 1, wherein the at least one first and at least one second wavelength dependent modification features comprises an ink, dye or pigment.

4. A lighting device as claimed in claim 1, wherein the at least one first and at least one second wavelength dependent modification features are uniformly arranged, or in a pattern.

5. A lighting device as claimed in claim 1, wherein the at least first and second LED chips comprise a red LED chip, a green LED chip, and a blue LED chip configured to emit light from five surfaces of the LED package.

6. A lighting device as claimed in claim 5, wherein one of the at least one first and at least one second wavelength dependent modification features is at least one of:
   a) cyan colored and arranged to be closer to the red LED chip than either of the green LED chip or the blue LED chip;
   b) magenta colored and arranged to be closer to the green LED chip than either of the red LED chip or the blue LED chip; or
   c) yellow colored and arranged to be closer to the blue LED chip than either of the red LED chip or the green LED chip.

7. A lighting device as claimed in claim 6 wherein:
   the cyan colored wavelength dependent modification feature is equidistant from the green LED chip and the blue LED chip;
   magenta colored wavelength dependent modification feature is equidistant from the red LED chip and the blue LED chip; or
   the yellow colored wavelength dependent modification feature is equidistant from the red LED chip and the green LED chip.

8. A lighting device as claimed in claim 1 wherein, the at least first and second LED chips comprise a red LED chip, a green LED chip, and a blue LED chip configure to emit light from a single surface of the LED package.

9. A lighting device as claimed in claim 8 wherein one of the at least one first and at least one second wavelength dependent modification features is at least one of:
   a) cyan colored and arranged to be further away from the red LED chip than either of the green LED chip or the blue LED chip;
   b) magenta colored and arranged to be further away from the green LED chip than either of the red LED chip or the blue LED chip; or
   c) yellow colored and arranged to be further away from the blue LED chip than either of the red LED chip or the green LED chip.

10. A lighting device as claimed in claim 9, wherein:
    the cyan colored wavelength dependent modification feature is equidistant from the green LED chip and the blue LED chip;
    the magenta colored wavelength dependent modification feature is equidistant from the red LED chip and the blue LED chip;
    the yellow colored wavelength dependent modification feature is equidistant from the red LED chip and the green LED chip.

11. A method of generating a homogeneous color light output, the method comprising:
    optically coupling at least first and second spatially separated light outputs into a light guide, wherein the first light output is at a first wavelength, and the second light output is at a second wavelength that is different from the first wavelength;
    arranging for a portion of the two or more light outputs to exit the light guide via a light output surface; and
    providing the light guide with:
       at least one first wavelength dependent modification feature located on a first area of the light output surface and configured to selectively modify an intensity of the first of the at least first and second spatially separated light outputs; and
       at least one second wavelength dependent modification feature located on a second area of the light output surface and configured to selectively modify the intensity of the second of the at least first and second spatially separated light outputs.

12. A method of generating a homogeneous color light output as claimed in claim 11, the method further comprising:
    providing a diffuser, and
    providing an opaque mask with at least one aperture, the opaque mask located between the two or more spatially separated light outputs and the diffuser.

13. A method of generating a homogeneous color light output as claimed in claim 11, wherein optically coulping the at least first and second spatially separated light outputs into the light guide comprises optically coupling a red, a green and a blue light output into the light guide.

14. A method of generating a homogeneous color light output as claimed in claim 13, wherein providing the light guide with at least one first and at least one second wavelength dependent modification features comprises providing a cyan colored wavelength dependent modification feature further away from the red light output than either of the green light output or the blue light output.

15. A method of generating a homogeneous color light output as claimed in claim 13, wherein providing the light guide with at least one first and at least one second wavelength dependent modification features comprises providing a magenta colored wavelength dependent modification feature further away from the green light output than either of the red light output or the blue light output.

16. A method of generating a homogeneous color light output as claimed in claim 13, wherein providing the light guide with at least one first and at least one second wavelength dependent modification features comprises providing a yellow colored wavelength dependent modification feature further away from the blue light output than either of the red light output or the green light output.

17. A method of generating a homogeneous color light output as claimed in claim 13, wherein providing the light guide with at least one first and at least one second wavelength dependent modification feature comprises providing at least one of:
  a) a cyan coloured wavelength dependent modification feature closer to the red light output than either of the green light output or the blue light output;
  b) a magenta coloured wavelength dependent modification feature closer to the green light output than either of the red light output or the blue light output; or
  c) a yellow coloured wavelength dependent modification feature closer to the blue light output than either of the red light output or the green light output.

18. A method of generating a homogeneous color light output as claimed in claim 17, wherein the cyan colored wavelength dependent modification feature is provided equidistant from the green light output and the blue light output.

19. A method of generating a homogeneous color light output as claimed in claim 17 wherein the magenta colored wavelength dependent modification feature is provided equidistant from the red light output and the blue light output.

20. A method of generating a homogeneous color light output as claimed in claim 17 wherein the yellow colored wavelength dependent modification feature is provided equidistant from the red light output and the green light output.

* * * * *